United States Patent
Branson et al.

(10) Patent No.: US 9,917,900 B2
(45) Date of Patent: Mar. 13, 2018

(54) OPERATOR MOVEMENT BASED ON MEMORY

(71) Applicant: International Business Machines Corporation, Armonk, NY (US)

(72) Inventors: Michael J. Branson, Rochester, MN (US); Jay S. Bryant, Rochester, MN (US); James E. Carey, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 14/848,518

(22) Filed: Sep. 9, 2015

(65) Prior Publication Data

US 2017/0070571 A1 Mar. 9, 2017

(51) Int. Cl.
*H04L 29/08* (2006.01)
*G06F 3/06* (2006.01)

(52) U.S. Cl.
CPC .......... *H04L 67/1097* (2013.01); *G06F 3/061* (2013.01); *G06F 3/067* (2013.01); *G06F 3/0635* (2013.01); *G06F 3/0683* (2013.01); *H04L 67/1008* (2013.01); *G06F 2206/1012* (2013.01)

(58) Field of Classification Search
None
See application file for complete search history.

(56) References Cited

U.S. PATENT DOCUMENTS

| | | | |
|---|---|---|---|
| 8,060,614 B2 | 11/2011 | Goldstein et al. | |
| 8,555,349 B2 | 10/2013 | Simula et al. | |
| 8,600,976 B2 | 12/2013 | Cradick et al. | |
| 8,782,628 B2 | 7/2014 | Andrade et al. | |
| 8,782,656 B2 | 7/2014 | Accola et al. | |
| 8,972,480 B2 | 3/2015 | Branson et al. | |
| 2010/0293532 A1* | 11/2010 | Andrade | G06F 11/1438 717/140 |
| 2011/0238532 A1 | 9/2011 | Zargahi | |

(Continued)

OTHER PUBLICATIONS

Zhang et al., "Performance Modeling of Operators in a Streaming System", IBM Research Report dated Jan. 12, 2009, 15 pages.

(Continued)

*Primary Examiner* — Natisha Cox
(74) *Attorney, Agent, or Firm* — Patterson + Sheridan, LLP

(57) ABSTRACT

Systems, methods, and computer program products to perform an operation comprising providing a plurality of processing elements comprising one or more operators, the operators configured to process streaming data tuples, establishing an operator graph of a plurality of operators, the operator graph defining at least one execution path in which a first operator of the plurality of operators is configured to: (i) receive data tuples from at least one upstream operator and (ii) transmit data tuples to at least one downstream operator, wherein the first operator executes on a first compute node of a plurality of compute nodes, monitoring a memory use by the first operator on the first compute node, and upon determining that the memory use of the first operator exceeds a memory threshold, moving the first operator to a second compute node, of the plurality of compute nodes.

20 Claims, 7 Drawing Sheets

(56) References Cited

U.S. PATENT DOCUMENTS

| | | | |
|---|---|---|---|
| 2012/0179809 A1* | 7/2012 | Barsness | G06F 17/30516 709/224 |
| 2013/0166942 A1* | 6/2013 | Branson | G06F 11/0793 714/3 |
| 2013/0166948 A1* | 6/2013 | Branson | G06F 11/0793 714/15 |
| 2013/0305034 A1* | 11/2013 | Branson | H04L 9/088 713/150 |
| 2014/0172810 A1 | 6/2014 | Paradies et al. | |
| 2014/0310258 A1* | 10/2014 | Tian | G06F 17/30445 707/718 |
| 2014/0310259 A1* | 10/2014 | Tian | G06F 17/30545 707/718 |
| 2014/0359271 A1 | 12/2014 | Gedik et al. | |
| 2014/0359567 A1 | 12/2014 | Avadhanula et al. | |
| 2014/0379711 A1 | 12/2014 | Branson et al. | |
| 2015/0007144 A1 | 1/2015 | Barsness et al. | |
| 2015/0149615 A1* | 5/2015 | Broussard | H04L 47/726 709/224 |

OTHER PUBLICATIONS

Gao et al., "Improved Differential Evolution Algorithm With Random Migration Operator", 2009 International Conference on Computational Intelligence and Security, pp. 1-6.

Pietzuch et al., "Network-Aware Operator Placement for Streaming-Processing Systems", IEEE Proceedings of the 22nd International Conference on Data Engineering (ICDE '06), 12 pages.

Balazinska et al., "Load Management and High Availability in the Medusa Distributed Stream Processing System", SIGMOD 2004, Jun. 13-18, 2004, Paris, France, pp. 1-2. <http://nms.lcs.mit.edu/projects/medusa/>.

* cited by examiner

OPERATOR MOVEMENT BASED ON MEMORY

BACKGROUND

The present invention relates to computer software, and more specifically, to computer software to move operators in streams computing applications based on memory use by the operators.

Streams computing applications may consist of streams of data flowing through elements of processing that form an operator graph. Many streams computing applications are written such that data structures within operators grow in size the longer the application runs. It is often difficult to determine which operators will grow in size as the data itself (namely, data tuples sent into the operator graph) dictates which data structures will grow in size. For example, consider an application that tracks vehicles distributes its data across a cluster of compute nodes by zip code. While one can reasonably assume that larger cities will have larger data volumes, it is often hard to predict the data volumes of smaller cities and towns. Eventually, in this type of distributed environment, operators may be placed on machines without truly understanding the resource requirements of the operators.

SUMMARY

Embodiments disclosed herein provide systems, methods, and computer program products to perform an operation comprising providing a plurality of processing elements comprising one or more operators, the operators configured to process streaming data tuples, establishing an operator graph of a plurality of operators, the operator graph defining at least one execution path in which a first operator of the plurality of operators is configured to: (i) receive data tuples from at least one upstream operator and (ii) transmit data tuples to at least one downstream operator, wherein the first operator executes on a first compute node of a plurality of compute nodes, monitoring a memory use by the first operator on the first compute node, and upon determining that the memory use of the first operator exceeds a memory threshold, moving the first operator to a second compute node, of the plurality of compute nodes.

DETAILED DESCRIPTION

Embodiments disclosed herein provide techniques to migrate (or move) operators to different compute nodes in a compute cluster based on memory needs of the operators. Generally, embodiments disclosed herein monitor the amount of memory that an operator uses. As the memory use grows, an operator's memory use may exceed a memory threshold (such as a specified amount of memory, or a percentage of memory). When the operator's memory use exceeds the memory threshold, embodiments disclosed herein may move the operator to a different compute node in the compute cluster.

For example, if operator A, executing on compute node 1, has a memory use that exceeds the memory threshold, embodiments disclosed herein may move operator A to compute node 2. In addition, in some embodiments, operator B of compute node 2 may be moved to a different compute node in the cluster to make room for operator A. In some embodiments, if operator A's memory use returns to normal levels (or below a specified threshold), operator A may be returned to compute node 1.

Embodiments disclosed herein may move operators in any number of ways, and in some cases, may be completely transparent to the end user (i.e., no data loss, no interruption of application execution, no state loss, and the like). In one embodiment, moving an operator may comprise stopping the operator, freezing data in the streams application, restarting the operator once moved, and resuming data flow in the streams application. In another embodiment, the entire runtime environment may be stopped, the operator moved to a different compute node, and the runtime environment may then be restarted. In some embodiments, each operator may have associated metadata specifying how the operator should be moved (e.g., whether to maintain state, what state to maintain, a preferred method to move the operator, and the like).

Figure 1A:
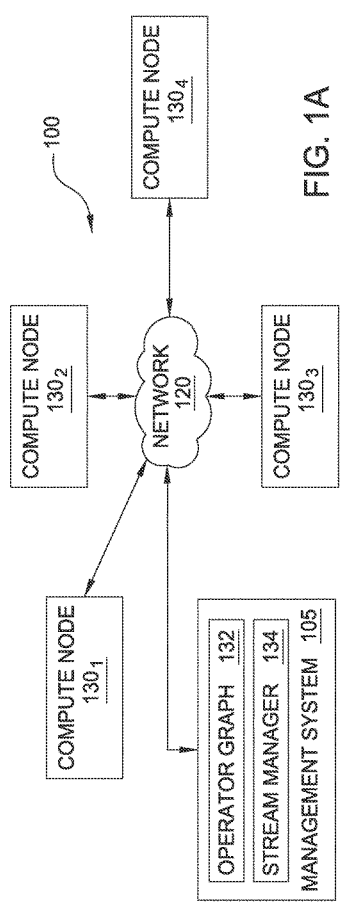
FIGS. 1A-1B illustrate a computing infrastructure configured to execute a streams computing application, according to embodiments disclosed herein.
Figure 1B:
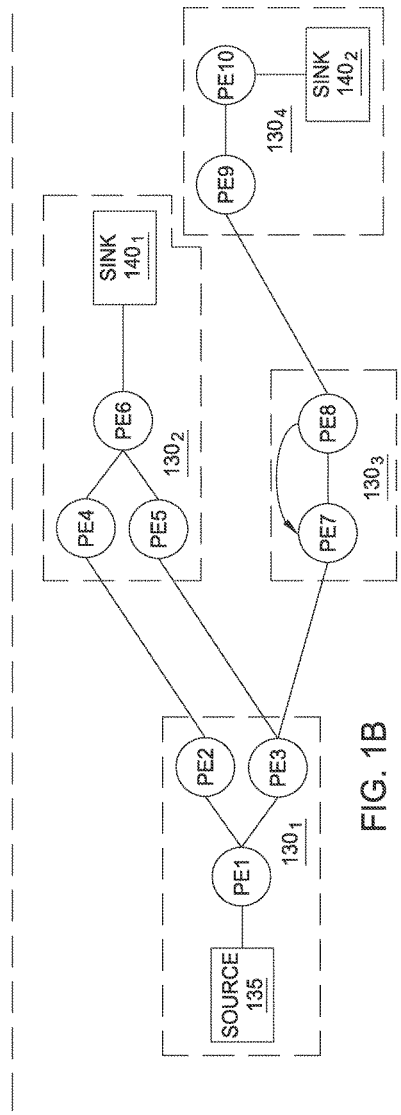

FIGS. 1A-1B illustrate a computing infrastructure configured to execute a streams computing application, according to embodiments disclosed herein. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more operators in one or more source processing elements (PEs) through to one or more operators in one or more sink PEs. This flow from source to sink is also generally referred to herein as an execution path. Generally, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates).

In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values. In one embodiment, one or more attributes of a data tuple may be encrypted. However, not all operators have the correct keys and mechanisms to decrypt data tuples. Based on the access indicators of the operators, the operator may or may not be able to decrypt data tuples.

Of course, the N-tuple received by an operator need not be the same N-tuple sent downstream. Additionally, operators could be configured to receive or emit tuples in other formats (e.g., the PEs or operators could exchange data marked up as XML documents). Based on policies and operator access indicators, operators that have decrypted data tuples may reencrypt the decrypted data tuples before sending them downstream, or may emit the decrypted data tuples. Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes 130$_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, the stream manager 134 may monitor memory use by operators on the compute nodes 130$_{1-4}$, and determine whether any of the operators use memory at a level that exceeds a memory threshold. If an operator uses memory at a level that exceeds the memory threshold, the stream manager 134 may move the operator to a different compute node. Further, stream manager 134 may control the stream computing application by inserting, removing, fusing, un-fusing, or otherwise modifying the processing elements and operators (or what data tuples flow to the processing elements and operators) running on the compute nodes 130$_{1-4}$. One example of a stream computing application is IBM®'s InfoSphere® Streams (InfoSphere® is a trademark of International Business Machines Corporation, registered in many jurisdictions worldwide).

FIG. 1B illustrates an example processing element graph that includes ten processing elements (labeled as PE1-PE10) running on the compute nodes 130$_{1-4}$. A processing element is composed of one or more operators fused (or combined) together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the processing element graph begins at a source 135 (that flows into the processing element labeled PE1) and ends at sink 140$_{1-2}$ (that flows from the processing elements labeled as PE6 and PE10). Compute node 130$_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node 130$_2$. Likewise, the data tuples emitted by the operators in PE4 flow to the operators sink PE6 140$_1$. Similarly, data tuples flowing from operators in PE3 to operators in PE5 also reach operators in sink PE6 140$_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node 130$_3$, which itself shows data tuples flowing to operators in PE8 and looping back to operators in PE7. Data tuples emitted from operators in PE8 flow to operators in PE9 on compute node 130$_4$, which in turn emits tuples to be processed by operators in sink PE10 140$_2$.

Because a processing element is a collection of fused operators, it is equally correct to describe the operator graph as data flow paths between specific operators, which may include data flow paths to different operators within the same processing element. FIGS. 1B-1D illustrate data flow paths between processing elements for the sake of clarity.

As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a segment of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a metadata 250, a state data 260, and a tuples 270. The metadata 250 stores metadata related to each of the operators 240. The metadata 250 may specify rules or conditions for moving a given operator 240 to a different compute node 130, such as whether to maintain the operator's state, and if so, which variables to maintain state data for. The state data 260 is used to store state data of the operators 240 that are being moved to different compute nodes. Storing the state data of an operator 240 allows the operator 240 to restart on a new compute node where it was stopped before being moved. The tuples 270 is configured to store data tuples that are to be processed by an operator 240 that is being moved (and is therefore unavailable to process streaming data tuples). When the operator 240 is being moved, the streams manager 134 may store the data tuples in the tuples 270, which may then be provided to the operator 240 once the operator 240 is restarted on a new compute node. Although shown as being in storage 230, the metadata 250, state data 260, and tuples 270 may be located in the memory 225 of the compute node 130 or a combination of both. Moreover, storage 230 may include storage space that is external to the compute node 130.

Figure 3:
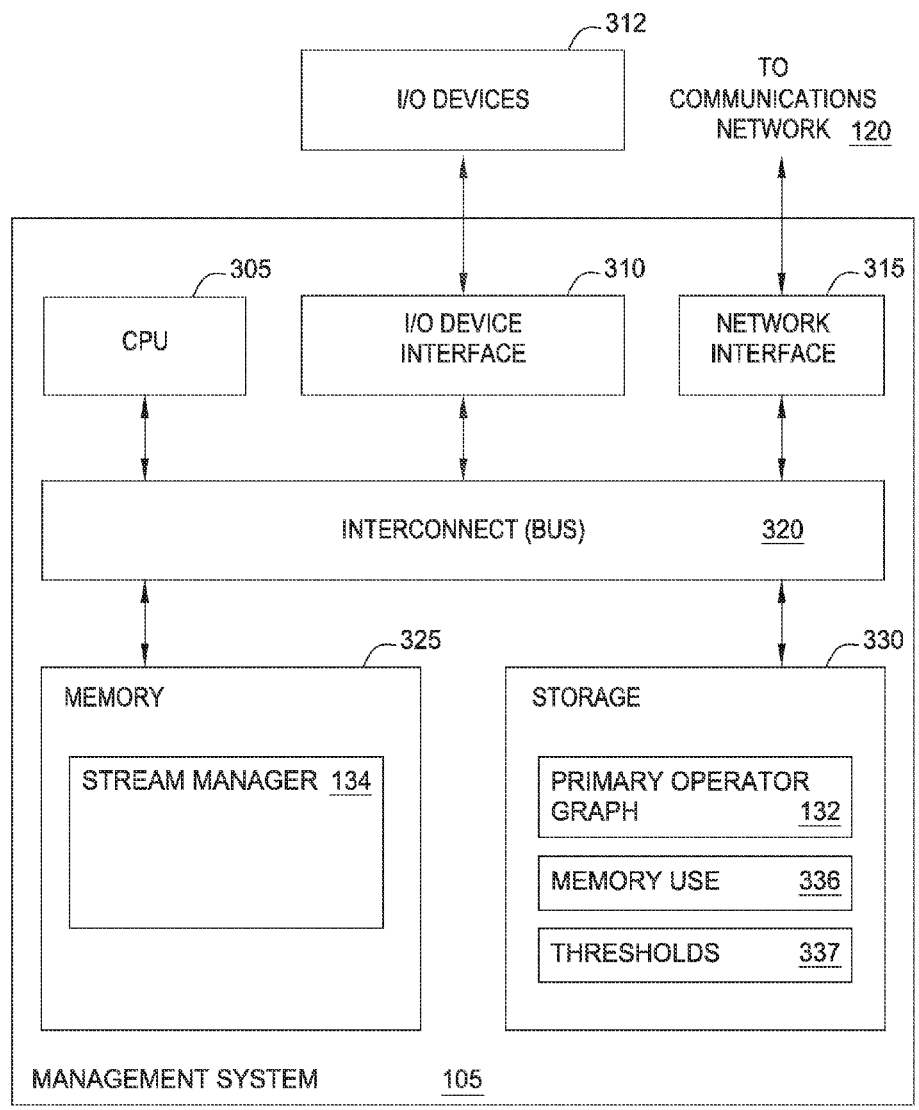
FIG. 3 is a more detailed view of the server management system of FIGS. 1A-1B, according to one embodiment.

FIG. 3 is a more detailed view of the server management system 105 of FIG. 1, according to one embodiment disclosed herein. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Figure 2:
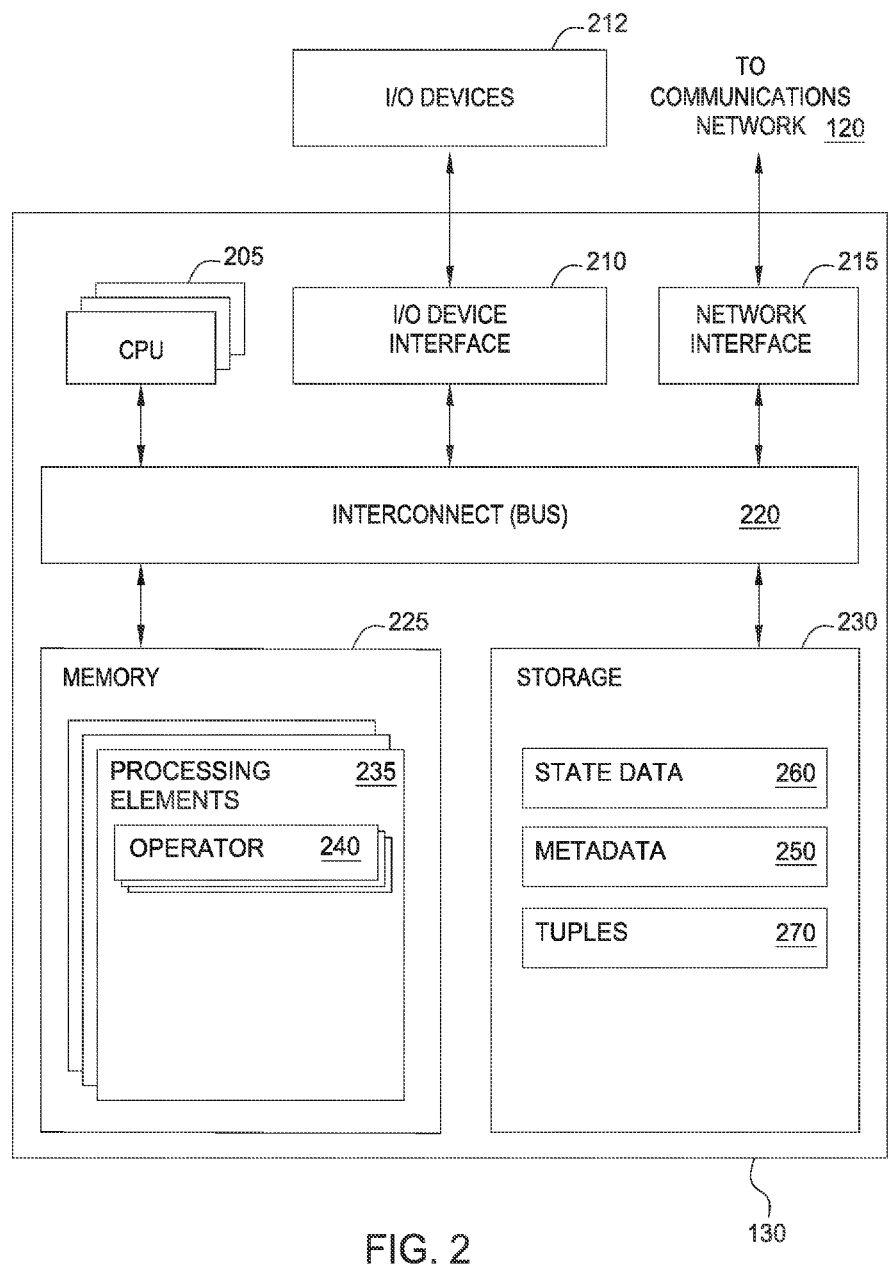
FIG. 2 is a more detailed view of the compute node of FIGS. 1A-1B, according to one embodiment.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing. As shown, the storage 330 includes a memory use 336 and a thresholds 337. The memory use 336 is configured to store current memory use values for each of a plurality of operators 240. The thresholds 337 stores memory usage thresholds for one or more operators 240. The thresholds may be, for example, a percentage of available memory 225 on a compute node, a percentage of available memory of the memory 225 allocated to an operator 240, a hard value (such as one gigabyte of memory), and the like. The thresholds 337 may be upper limits which, when exceeded, cause the streams manager 134 to move an operator 240 to a different compute node 130. The thresholds may also be lower limits. For example, if an operator has been moved due to memory use exceeding a first threshold, if the operator's memory use subsequently falls below a second threshold, the streams manager 134 may return the operator to the original compute node. In one embodiment, the second threshold is the first threshold. The thresholds 337 may be default thresholds and/or user-defined thresholds.

Figure 4A:
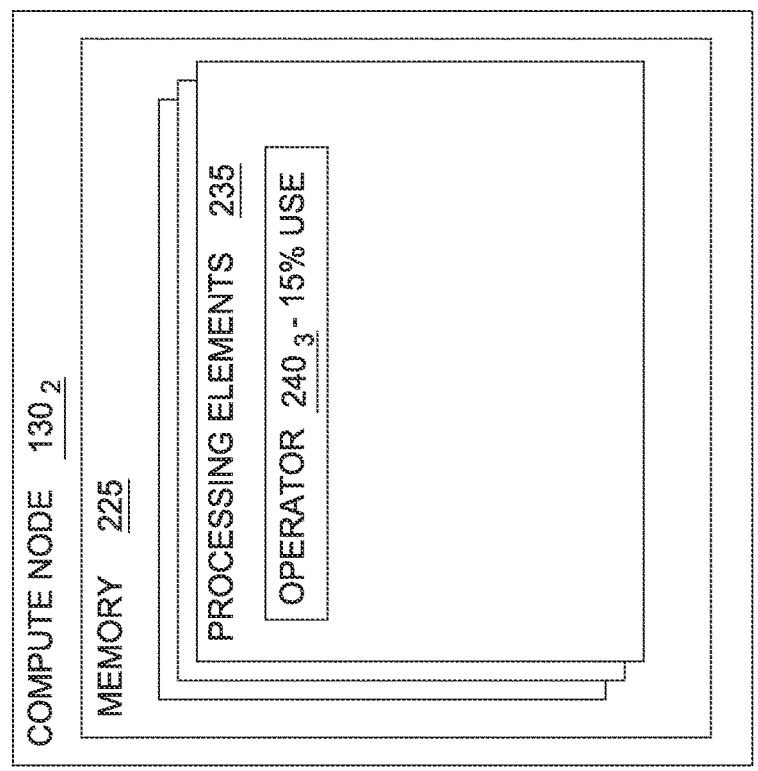
FIGS. 4A-4B depict techniques to move operators based on memory, according to one embodiment.
Figure 4A:
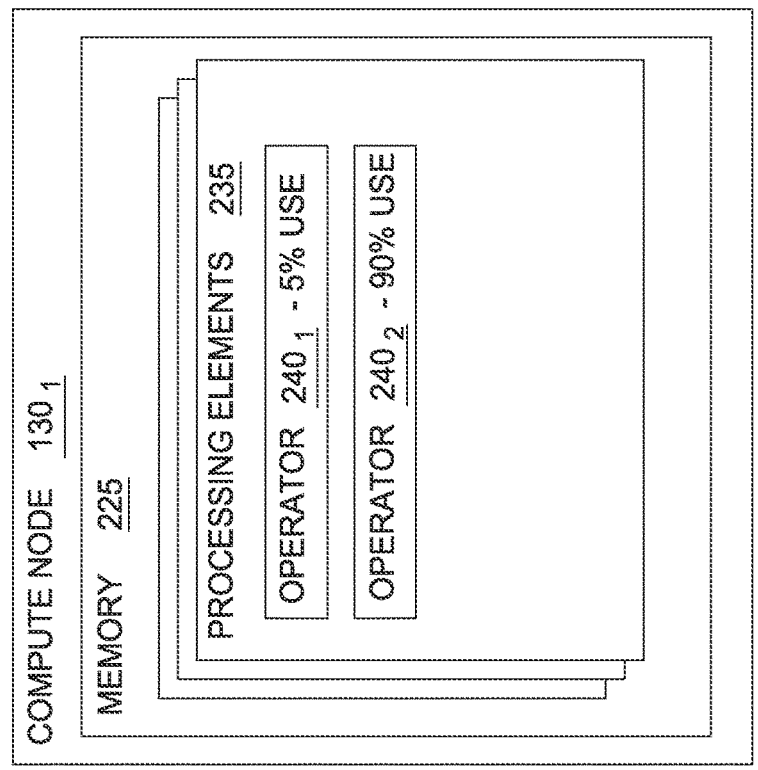

FIG. 4A depicts techniques to move operators based on memory, according to one embodiment. Specifically, FIG. 4A depicts two compute nodes $130_1$, $130_2$, each of which are hosting a plurality of processing elements 235 in the respective memories 225. As shown, the processing element 235 of compute node $130_1$ includes two operators $240_1$, $240_2$, while the processing element 235 of compute node $130_2$ includes an operator $240_3$. The streams manager 134 may monitor the use of system memory 225 by each of the operators $240_{1-3}$. For example, as shown, operator $240_1$ is currently using 5% of the memory 225 of compute node $130_1$ and operator $240_2$ is using 90% of the memory 225 of compute node $130_1$. In addition, operator $240_3$ is using 15% of the memory 225 of compute node $130_2$. If the streams manager 134 determines that an operator 240 uses memory at a level that exceeds a relevant value in the thresholds 337, the streams manager 134 may move that operator to a different compute node. For example, if the relevant threshold value specifies that an operator on compute node $130_1$ cannot use more than 50% of the memory 225, the streams manager 134 may move operator $240_2$ to a different compute node.

Figure 4B:
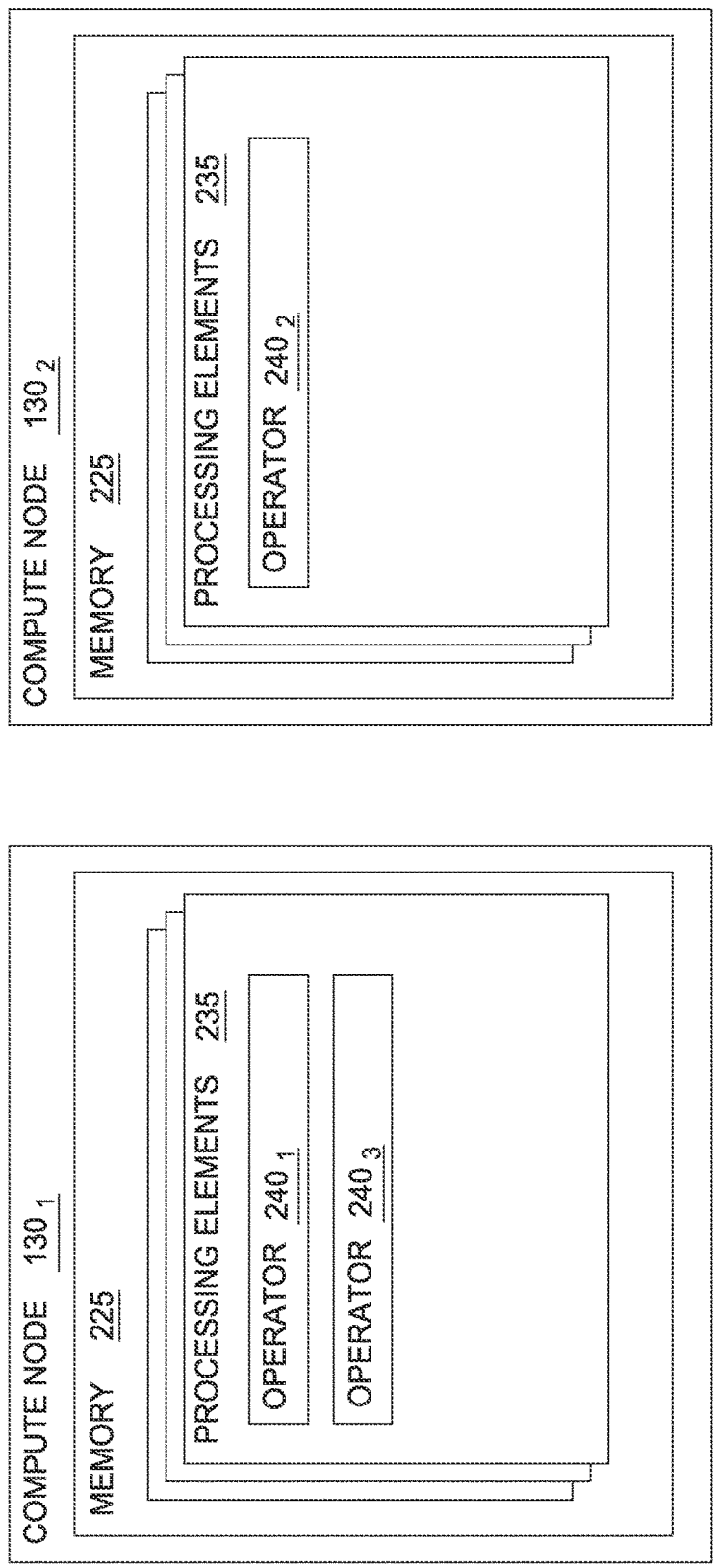

FIG. 4B depicts the compute nodes $130_1$, $130_2$ after moving the operator $240_2$ to compute node $130_2$. The streams manager 134 moved the operator $240_2$ to compute node $130_2$ because the operator $240_2$ used memory at a level that exceeded the relevant threshold. In addition, as shown, the streams manager 134 moved the operator $240_3$ to compute node $130_1$ to provide additional memory 225 to operator $240_2$. While depicted as being moved to compute node $130_1$, the streams manager 134 may move the operator $240_3$ to any compute node in the cluster. It should be noted that moving operator $240_3$ is optional in some embodiments (for example, where moving operator $240_2$ to compute node $130_2$ would not exhaust all of the memory 225 of compute node $130_2$ in combination with operator $240_3$).

As previously indicated, a processing element 235 may have two or more operators fused together. In such embodiments, the streams manager 134 may monitor the memory use of each operator separately. If a first operator is determined to use memory at a level that exceeds a threshold, the streams manager 134 may unfuse the fused operators, and move the first operator to a different compute node, leaving the remaining operators on the same compute node.

Figure 5:
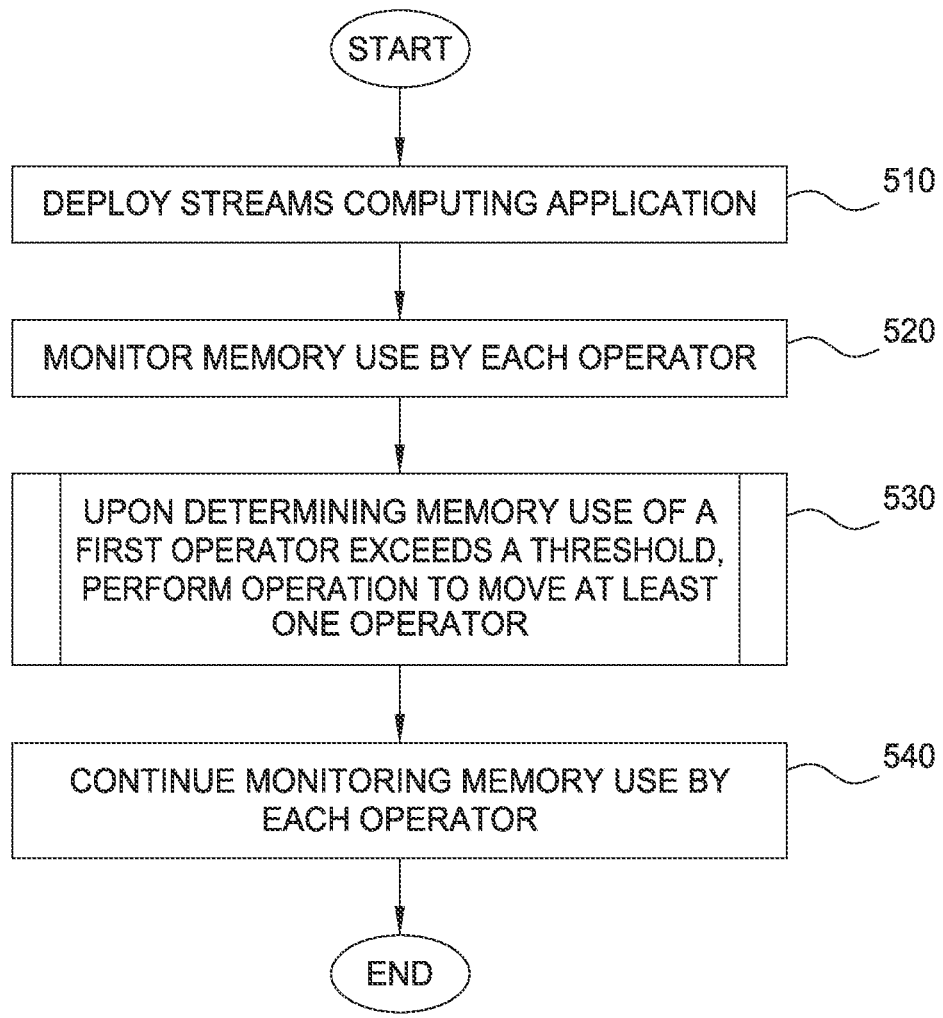
FIG. 5 is a flow chart illustrating a method to move operators based on memory, according to one embodiment.

FIG. 5 is a flow chart illustrating a method 500 to move operators based on memory, according to one embodiment. Generally, the streams manager 134 may implement the steps of the method 500 to move operators that are using excessive amounts of system memory. The method beings at step 510, where a streams computing application is deployed to a plurality of compute nodes 130. The streams computing application, as previously discussed, may include a plurality of processing elements 235 that have one or more operators 240. Data tuples may be processed according to the operator graph 132. At step 520, the streams manager 134 may monitor the use of system memory by each operator 240 in the streams computing application. For example, the streams manager 134 may determine that operator X is currently using 1.5 gigabytes of memory. At step 530, described in greater detail with reference to FIG. 6, the streams manager 134 may perform an operation to move at least one operator upon determining that a first operator uses memory at a level exceeding a threshold 337. For example, if the threshold is 1.0 GB of memory, the streams manager 134 may move operator X to a different compute node having sufficient memory to host operator X. At step 540, the streams manager 134 may continue to monitor memory use by each operator in the streams computing application.

Figure 6:
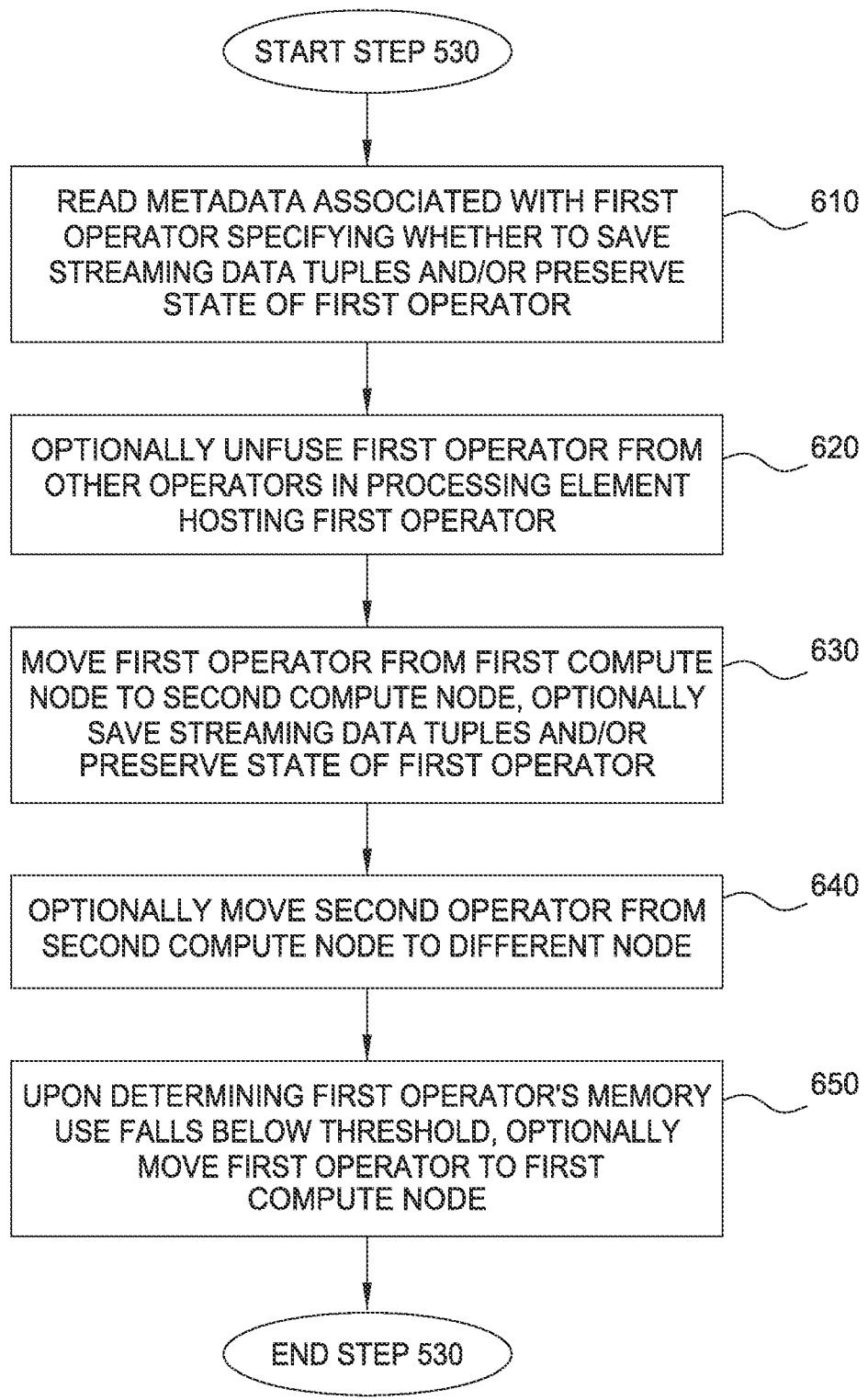
FIG. 6 is a flow chart illustrating a method to move an operator, according to one embodiment.

FIG. 6 is a flow chart illustrating a method 600 corresponding to step 530 to move an operator, according to one embodiment. As shown, the method 600 begins at step 610, where the streams manager 134 may read metadata 250 associated with the first operator. The metadata 250 may specify conditions for moving the first operator (upon determining the first operator's memory use exceeds a threshold). For example, the metadata 250 may specify whether data tuples to be processed by the first operator should be saved so that the first operator can process the saved tuples when it is restarted on a different compute node. In addition, the metadata 250 may specify whether to preserve the state data of the first operator, such that the first operator may pick up where it left off when it is restarted on a different compute node.

At step 620, the streams manager 134 may optionally unfuse the first operator from other operators in a processing element hosting the first operator. In other embodiments, the streams manager 134 may move the entire fused operator to a different compute node, and forego unfusing the offending first operator. At step 630, the streams manager 134 may move the first operator from a first compute node to a second compute node. Furthermore, the streams manager 134 may optionally save streaming data tuples to be processed by the first operator. The streams manager 134 may further save the state of the first operator. The streams manager 134 may use any technique to move an operator, including stopping the operator, freezing the data in the operator graph, moving the code of the first operator to the new compute node, starting the first operator on the compute node, and resuming the data flow in the operator graph. In one embodiment, the streams manager 134 may instead freeze all compute nodes, move the code of the first operator to a different compute node, and restart the entire application once the first operator is moved. At step 640, the streams manager 134 may optionally move a second operator from the second compute node (the new home of the first operator) to a different compute node in the cluster (including the first compute node). The streams manager 134 may move the second operator for any reason, such as to provide the memory consumed by the second operator to the first operator. At step 650, the streams manager 134 may optionally move the first operator back to the first compute node upon determining that the first operator's memory use has fallen below a threshold 337. For example, if the first compute node has the most memory of any compute node in the cluster, it may be desirable to allow the first operator to execute on the first compute node. Therefore, when the first operator's memory use falls to acceptable levels, the streams manager 134 may return the first operator to the first compute node.

Advantageously, embodiments disclosed herein provide techniques to move operators in a streaming computing application when an operator's memory use exceeds predefined thresholds. The operators may be moved without any loss of data, and may be completely transparent to the end user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the streams manager 134 could execute on a computing system in the cloud and monitor memory use by operators in a streams computing application. In such a case, the streams manager 134 could move an operator to a new compute node and store the memory use data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing a plurality of processing elements comprising one or more operators, the operators configured to process streaming data tuples;
establishing an operator graph of a plurality of operators, the operator graph defining at least one execution path in which a first operator of the plurality of operators is configured to: (i) receive data tuples from at least one upstream operator and (ii) transmit data tuples to at least one downstream operator, wherein the first operator executes on a first compute node of a plurality of compute nodes;
monitoring a memory use by the first operator on the first compute node;
determining that the memory use of the first operator exceeds a memory threshold;
determining that metadata associated with the first operator specifies to transfer state data of a first variable of the first operator;

moving the first operator and, based on the metadata, the state data of the first variable to a second compute node, of the plurality of compute nodes; and starting the first operator on the second compute node.

2. The method of claim 1, wherein the second compute node hosts a second operator, of the plurality of operators, the method further comprising:

prior to moving the first operator to the second compute node, moving the second operator from the second compute node to a selected one of the plurality of compute nodes.

3. The method of claim 1, further comprising:

monitoring a memory use by the first operator on the second compute node; and upon determining that the memory use by the first operator on the second compute node falls below a threshold, moving the first operator from the second compute node to the first compute node.

4. The method of claim 1, further comprising:

storing a set of data tuples received by the first compute node to be processed by the first operator; and transferring the stored set of data tuples to the second compute node for processing by the first operator on the second compute node.

5. The method of claim 1, wherein the first variable is of a plurality of variables of the first operator, wherein the metadata associated with the first operator specifies to transfer state data each of the plurality of variables of the first operator to the second compute node, the method further comprising:

transferring the state data of each of the plurality of variables of the first operator to the second compute node.

6. The method of claim 1, wherein a first processing element comprises the first operator and a second operator, wherein the first and second operators are fused together, wherein moving the first operator to the second compute node further comprises unfusing the first operator and the second operator.

7. The method of claim 1, further comprising:

stopping each of the plurality of operators in the operator graph;

stopping the flow of data tuples in the operator graph; and restarting each of the plurality of operators in the operator graph subsequent to moving the first operator to the second compute node.

8. A system, comprising:

a plurality of compute nodes configured to host a plurality of processing elements, each of the plurality of processing elements comprising one or more operators, the operators configured to process streaming data tuples;

an operator graph of a plurality of operators, the operator graph defining at least one execution path in which a first operator of the plurality of operators is configured to: (i) receive data tuples from at least one upstream operator and (ii) transmit data tuples to at least one downstream operator, wherein the first operator executes on a first compute node of the plurality of compute nodes;

a resource manager configured to perform an operation comprising:

monitoring a memory use by the first operator on the first compute node;

determining that the memory use of the first operator exceeds a memory threshold;

determining that metadata associated with the first operator specifies to transfer state data of a first variable of the first operator;

moving the first operator and, based on the metadata, the state data of the first variable to a second compute node, of the plurality of compute nodes; and starting the first operator on the second compute node.

9. The system of claim 8, wherein the second compute node hosts a second operator, of the plurality of operators, the operation further comprising:

prior to moving the first operator to the second compute node, moving the second operator from the second compute node to a selected one of the plurality of compute nodes.

10. The system of claim 8, the operation further comprising:

monitoring a memory use by the first operator on the second compute node; and upon determining that the memory use by the first operator on the second compute node falls below a threshold, moving the first operator from the second compute node to the first compute node.

11. The system of claim 8, the operation further comprising:

storing a set of data tuples received by the first compute node to be processed by the first operator; and transferring the stored set of data tuples to the second compute node for processing by the first operator on the second compute node.

12. The system of claim 8, wherein the first variable is of a plurality of variables of the first operator, wherein the metadata associated with the first operator specifies to transfer state data each of the plurality of variables of the first operator to the second compute node, the operation further comprising:

transferring the state data of each of the plurality of variables of the first operator to the second compute node.

13. The system of claim 8, wherein a first processing element comprises the first operator and a second operator, wherein the first and second operators are fused together, wherein moving the first operator to the second compute node further comprises unfusing the first operator and the second operator.

14. The system of claim 8, the operation further comprising:

stopping each of the plurality of operators in the operator graph;

stopping the flow of data tuples in the operator graph; and restarting each of the plurality of operators in the operator graph subsequent to moving the first operator to the second compute node.

15. A computer program product, comprising:

a computer-readable storage medium having computer-readable program code embodied therewith, the computer-readable program code executable by one or more computer processors to perform an operation comprising:

providing a plurality of processing elements comprising one or more operators, the operators configured to process streaming data tuples;

establishing an operator graph of a plurality of operators, the operator graph defining at least one execution path in which a first operator of the plurality of operators is configured to: (i) receive data tuples from at least one upstream operator and (ii) transmit data tuples to at least one downstream operator, wherein the first operator executes on a first compute node of a plurality of compute nodes;

monitoring a memory use by the first operator on the first compute node;

determining that the memory use of the first operator exceeds a memory threshold;

determining that metadata associated with the first operator specifies to transfer state data of a first variable of the first operator;

moving the first operator and, based on the metadata, the state data of the first variable to a second compute node, of the plurality of compute nodes; and starting the first operator on the second compute node.

16. The computer program product of claim 15, wherein the second compute node hosts a second operator, of the plurality of operators, the operation further comprising:

prior to moving the first operator to the second compute node, moving the second operator from the second compute node to a selected one of the plurality of compute nodes.

17. The computer program product of claim 15, the operation further comprising:

monitoring a memory use by the first operator on the second compute node; and upon determining that the memory use by the first operator on the second compute node falls below a threshold, moving the first operator from the second compute node to the first compute node.

18. The computer program product of claim 15, the operation further comprising:

storing a set of data tuples received by the first compute node to be processed by the first operator; and transferring the stored set of data tuples to the second compute node for processing by the first operator on the second compute node.

19. The computer program product of claim 15, wherein the first variable is of a plurality of variables of the first operator, wherein the metadata associated with the first operator specifies to transfer state data each of the plurality of variables of the first operator to the second compute node, the operation further comprising:

transferring the state data of each of the plurality of variables of the first operator to the second compute node.

20. The computer program product of claim 15, wherein a first processing element comprises the first operator and a second operator, wherein the first and second operators are fused together, wherein moving the first operator to the second compute node further comprises unfusing the first operator and the second operator, wherein the operation further comprises:

stopping each of the plurality of operators in the operator graph;

stopping the flow of data tuples in the operator graph; and restarting each of the plurality of operators in the operator graph subsequent to moving the first operator to the second compute node.

\* \* \* \* \*